(12) United States Patent
Nemecek

(10) Patent No.: US 6,403,912 B1
(45) Date of Patent: Jun. 11, 2002

(54) ELECTRODE HOLDER

(76) Inventor: Gregory Otto John Nemecek, 636 Birkdale Ct., Coopersville, MI (US) 49404

(*) Notice: Subject to any disclaimer, the term of this patent is extended or adjusted under 35 U.S.C. 154(b) by 0 days.

(21) Appl. No.: 09/657,944

(22) Filed: Sep. 8, 2000

(51) Int. Cl.[7] .................................................. B23H 7/26
(52) U.S. Cl. ............................. 219/69.15; 204/224 M
(58) Field of Search .................... 219/69.15; 204/224 M

(56) References Cited

U.S. PATENT DOCUMENTS

| 2,978,616 A | 4/1961 | Pfau |
| 3,614,370 A | 10/1971 | Italo |
| 4,319,115 A | 3/1982 | Bonga |
| 4,713,515 A | 12/1987 | Choi |
| 5,791,803 A | 8/1998 | Nordquist |

FOREIGN PATENT DOCUMENTS

| DE | 3005639 | * 8/1981 | ............. 219/69.15 |
| JP | 7-178625 | * 7/1995 | |
| JP | 9-136204 | * 5/1997 | |

* cited by examiner

Primary Examiner—Geoffrey S. Evans
(74) Attorney, Agent, or Firm—Karen Lee Orzechowski; Liniak Berenato Longacre & White

(57) ABSTRACT

A pivotal two-piece EDM electrode holder having a stationary base; a rotating head pivotally positioned over the stationary base; two end caps on the stationary base; and a pocket positioned in the center of the rotating head for receiving an electrode. Adjustment apparatus secure the rotating head in the desired position to the stationary base during the EDM process.

26 Claims, 3 Drawing Sheets

ELECTRODE HOLDER

The present invention relates to an electrode holder suitable for use in making gates, sub-gates or other angled burns. In particular, this invention relates to a two-piece, pivotal gate electrode holder applied in electrical discharge machining (EDM) so as to eliminate time spent on producing temporary holders and allow installation of gates on any size mold.

BACKGROUND OF THE INVENTION

Plastic parts, whether they be plastic spoons or dashboard components, are molded in plastic injection molds. Many times the mold produced to manufacture these parts have features in the cavity or the runner system that require EDM burning to be done on angles (for example sub-gates). A sub-gate is a feature that allows the plastic injected into the mold to get into the cavity region. Gates have typically been installed in molds either by 1) making a temporary holder out of inexpensive material incorporating the angle at which the gate is to be installed and then burning the gate into the mold or 2) tipping the mold at an angle to allow the burning process to be done in a purely "Z" direction. The disadvantages of the above processes are that the temporary holder is usually discarded thereby wasting time and money in producing this temporary holder for one use and that tipping the mold is not practical when working with larger molds. The injected plastic gets into the mold cavity region by means of a gate.

These disadvantages are overcome by the two-piece holder joined by a common pivot point held in place by a holding means of the present invention. A variety of electrode holders for use in EDM have been disclosed in the relevant art but none of the references uncovered disclose or suggest the invention at hand.

U.S. Pat. No. 2,978,616, issued Apr. 4, 1961 to Pfau, discloses an electrode holder for use with an electroerosion machine, comprising a magnetic chuck having two circular discs of ferromagnetic material having flat end faces contacting each other, one of the discs being movable in the unmagnetized state and adapted to support the electrode, the other disc being stationary and having a first projection overlapping the movable disc and a second projection limiting the movement of the movable disc along the overlapping projection and defining the assembled position of the discs; and a means for creating a magnetic field holding the two discs in assembled position.

U.S. Pat. No. 3,614,370, issued Oct. 19, 1971 to Italo, discloses an electrode holder adapted to be used with an electric discharge machine which has an electrically conductive electrode, comprising a main housing that is generally annular to define a central opening having a central axis along which the electrode is fed during use; a base element rotatably supported by the main housing; an adjusting ring supported by the base element to be movable relative thereto; and electrically nonconductive guide rollers disposed symmetrically about the central axis to engage the electrode.

U.S. Pat. No. 4,319,115, issued Mar. 9, 1982 to Bonga, discloses an electrode tool holder for an EDM apparatus which can support either an electrode tool of large size or an electrode tool of small size, comprising an EDM apparatus with a ram consisting of two separate, linear moveably slide members, wherein one of the slide members carries a holder for an electrode tool of small dimension and wherein a second slide member is arranged to be coupled to the first slide member for supporting an electrode tool of large dimension.

U.S. Pat. No. 4,713,515, issued Dec. 15, 1987 to Choi, discloses an electrode holder for electric discharge processing machines that clamps the electrode in two perpendicular directions by clamp members, wherein each of the two clamp members slidably rests on a base seat which has side portions that extend at right angles to each other. The electrode holder disclosed in the '515 reference does not allow for the electrode to be placed in a plurality of positions while the rotating head of the electrode holder of the present invention allows the electrode to be placed a variety of different positions.

U.S. Pat. No. 4,853,512, issued Aug. 1, 1989 to Scheider, discloses a spark erosion machining apparatus with an electrode changing mechanism having an electrode storage means and electrode support members, wherein the electrode storage means comprises linkage means pivotally connecting the electrode support members to at least one side wall of the tub of the machining apparatus and wherein the electrode support members are pivotal from a retracted rest position near said side wall of the tub into an operating position in which they protrude from the side wall of the tub towards the interior of the tub into an operating region. While the electrode support members of the '512 patent are pivotal, the support member are pivotal only from the rest to the operating positions. In contrast, the rotating head of the present invention allows the electrode holder to be pivoted to a variety of operating positions.

U.S. Pat. No. 5,324,907 issued Jun. 28, 1994 to Wallace, discloses an EDM apparatus having a support base with adjustable slides mounted thereon; a cam arm mounted at one end on a piston rod that is used to cause vertical movement of the cam arm; a bore in the opposing end of the cam arm that rotatably receives a sleeve; and an electrode holder pivotally mounted in the sleeve such that one end of the electrode holder extends beyond the end of the sleeve, the electrode holder being movable between a first normal working position and a second non-working position that corresponds to movement of the cam arm. As in the '512 reference, the '907 reference only allows for pivoting the electrode holder between working and non-working positions, whereas the present invention provides for pivoting the electrode holder into a variety of working positions.

U.S. Pat. No. 5,791,803 issued Aug. 11, 1998 to Nordquist, discloses a compressive holding device serving as an electrode support having two coupling pieces and forcible elements for reversibly, axially, and compressively engaging the two coupling pieces in mutual engagement, where one of the coupling pieces has a plurality of aligning elements and the other coupling piece has a plurality of cooperating elements, and the aligning elements and/or cooperating elements are subjected to a force in the circumferential direction.

SUMMARY OF INVENTION

The object of the present invention is to provide a gate electrode holder that is reusable and compatible with a variety of mold sizes. A preferred embodiment of this invention is directed to a sub gate holder electrode holder for use in electric discharge machining (EDM).

This object is accomplished by the preferred embodiment of the present invention which provides for a sub gate electrode holder used in EDM comprising a stationary base having a first end and a second end; a rotating head having a first end and a second end, wherein the first end of the rotating head is pivotally positioned over the second end of the stationary base; two end caps affixable the second end of the stationary base; and a pocket positioned in the center of the second end of the rotating head for receiving an electrode.

The second end of the stationary base contains a spreader screw hole and a split. When a spreader screw is inserted and tightened into the spreader screw hole, the split allows the cylindrical end to flex, thereby securing the rotating head in the desired position to the cylindrical end of the stationary base. When the EDM process is complete, the spreader screw is removed, thereby releasing the stationary base from the rotating head and allowing the rotating head to be rotated into a new position for reuse.

The present invention also discloses an alternative preferred embodiment functioning exactly as the preferred embodiment but having a slightly different form in that the end caps are secured to the rotating head instead of the stationary base, and the rotating head has a slot as opposed to a pocket for receiving the electrode and has a plurality of screws (preferably five) for securing the electrode in place.

DETAILED DESCRIPTION OF THE INVENTION

Figure 1:
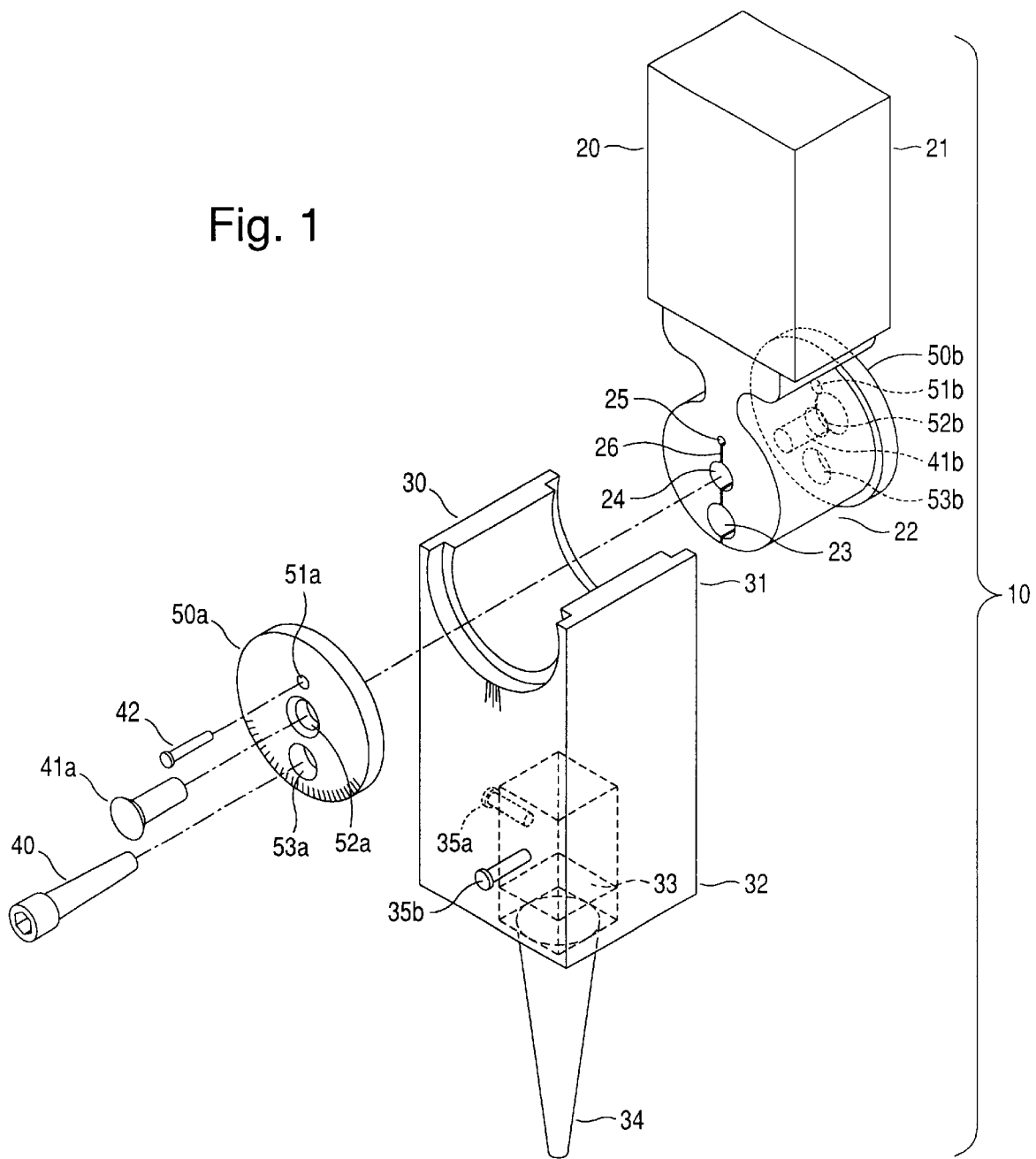
FIG. 1 is an exploded view of the preferred embodiment of the electrode holder of the present invention in the orientation.

As shown in FIG. 1, the electrode holder 10 of the present invention is comprised of a stationary base 20 having a first end 21 and a second end 22 and a rotating head 30 having a first end 31 and second end 32.

First end 21 of stationary base 20 is preferably cubical in form and affixed to the ram of an EDM machine (not shown). Second end 22 of stationary base 20 is cylindrical in form having a first flat end 22a and a second flat end 22b. First end 31 of rotating head 30 is concave in form to allow positioning over second cylindrical end 22 of stationary base 20. Second end 32 of rotating head 30 is cubical in form and has a pocket 33 located in its center for holding the electrode 34. Pocket screws 35a and 35b are positioned within second end 32 of rotating head 30 and extend into pocket 33 to secure the electrode 34 in place. FIG. 1. The electrode 34 is preferably composed of either carbon or copper.

Figure 2:
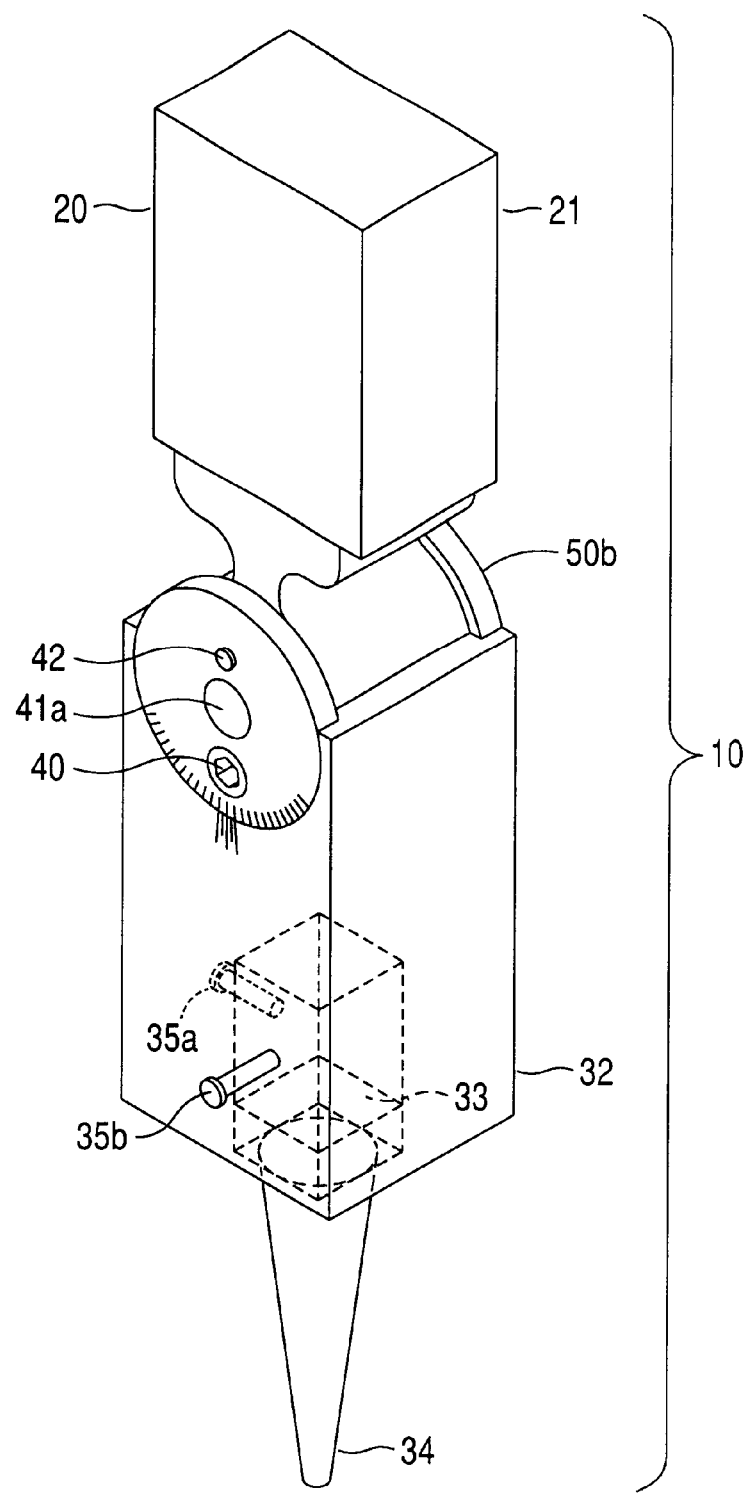
FIG. 2 illustrates the assembled electrode holder of the present invention in EDM orientation.

The second end 22 of stationary base 20 contains a tapered spreader screw hole 23 for receiving spreader screw 40, a center screw hole 24 for receiving end cap screws 41a and 41b, a dowel hole 25 for receiving dowel 42, and a split 26 as shown in FIGS. 1 and 2. Center screw hole 24 is positioned in the center of second end 22 of stationary base 20 and extends from first flat end 22a to second flat end 22b. Spreader screw hole 23 runs parallel to center screw hole 24 from first flat end 22a to second flat end 22b through the portion of second end 22 of stationary base 20 adjacent to rotating head 30. Dowel hole 25 runs parallel to center screw hole 24 from first flat end 22a to second flat end 22b through the portion of second end 22 of stationary base 20 adjacent to first end 21 of stationary base 20. Split 26, which extends from first flat end 22a to second flat end 22b, begins at dowel hole 25 and runs completely through the center of second end 22 of stationary base 20 in the direction of the rotating head 30.

When spreader screw 40 is inserted in spreader screw hole 23, the spreader screw taper seats out on the taper in the spreader screw hole 23 and forces apart the second end 22 of stationary base 20 at split 26. This flexing of second end 22 of stationary base 20 applies pressure to the first end 31 of rotating head 30 thereby securing rotating head 30 in place. The rotating head 30 should be pivoted into its desired position before tightening spreader screw 40.

As shown in FIG. 2, dowel 42 is inserted into dowel hole 25 for aligning end caps 50a and 50b to each flat end 22a and 22b of stationary base 20 in order to trap rotating head 30 onto stationary base 20. Each end cap 50a and 50b has an end cap dowel hole 51a and 51b respectively through which dowel 42 slides. Each end cap 50a and 50b is secured to flat ends 22a and 22b of stationary base 20 by inserting end cap screws 41a and 41b through end cap center screw holes 52a and 52b respectively into center screw hole 24. End caps 50a and 50b also provide end cap spreader screw holes 53a and 53b to allow for the insertion of spreader screw 40 into the spreader screw hole 23 of second end 22 of stationary base 20 after moving rotating head 30 into the desired position.

In order to adjust the electrode holder, the user must take hold of both the rotating head 30 and the stationary base 20 and adjust the holder to the angle of choice. Rotating head 30 can be rotated along the circumference of the second cylindrical end 22 of stationary base 20 in order to achieve the necessary position for any particular EDM process. When rotating head 30 is in the desired position, the user must tighten spreader screw 40 approximately ¾ turn. When spreader screw 40 is tightened to the point of resistance, rotating head 40 will remain in its set position. When the EDM process is complete, the pocket screws 35a and 35b are loosened or removed to allow removal of electrode 34 from the pocket 33 thereby freeing the pocket to receive another electrode. To readjust sub gate electrode holder 10, spreader screw 40 is backed out approximately ¾ turn so that the head moves freely to another position. To disassemble electrode holder 10, spreader screw 40 is backed out and center screw 41b (the center screw opposite the side of the spreader screw 40) is removed to allow removal of end cap 50b and the disengagement of stationary base 20 and rotating head 30.

Figure 3:
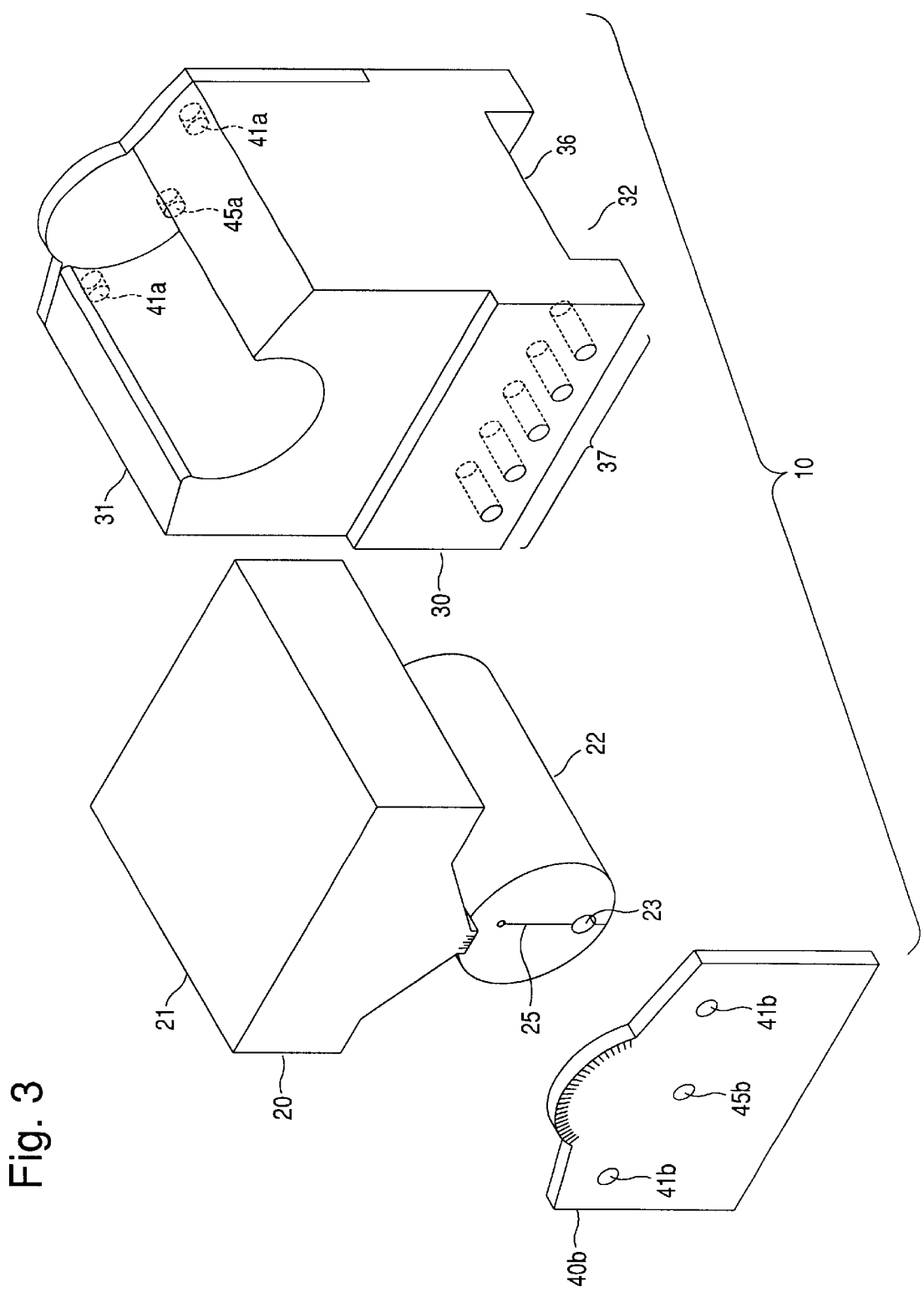
FIG. 3 is an exploded view of an alternative embodiment of the electrode holder of the present invention.

In an alternative preferred embodiment of the present invention shown in FIG. 3, the electrode holder 10 functions in the manner described above but is larger to accommodate larger electrode blanks. Furthermore, the end caps 50a and 50b are secured to the first end 31 of rotating head 30 instead of being secured to the second end 22 of stationary base 20. In other embodiments, the rotating head has a slot 36 as opposed to pocket 33 for receiving electrode 34 and has a plurality of screws 37 (preferably five) extending through second end 32 of rotating head 30 and into slot 36 to secure electrode 34 in place.

It is intended that all modifications obvious to persons skilled in the art are encompassed within the scope of this invention as defined by the claims below.

What is claimed is:

1. An electrode holder used in electrical discharge machining, comprising:

a stationary base having a first end and a second end;

a rotating head having a first end and a second end, wherein said first end of rotating head is pivotally positioned over said second end of said stationary base;

two end caps affixable to said second end of said stationary base; and a pocket positioned in center of said second end of said rotating head for receiving an electrode.

2. The electrode holder as in claim 1 wherein said first end of said stationary base has a cubical form.

3. The electrode holder as in claim 1 wherein said second end of said stationary base is cylindrical in form, having a first flat side and a second flat side.

4. The electrode holder as in claim 1 wherein said second end of said stationary base contains a split.

5. The electrode holder as in claim 3 wherein said second end of said stationary base contains a spreader screw hole extending from first flat side to second flat side.

6. The electrode holder as in claim 5 further comprising a spreader screw insertable into said spreader screw hole.

7. The electrode holder as in claim 5 wherein said second end of said stationary base further contains a center screw hole parallel to said spreader screw hole extending from first flat side to second flat side.

8. The electrode holder as in claim 7 further comprising a center screw insertable into said center screw hole.

9. The electrode holder as in claim 7 wherein said second end of said stationary base further contains a dowel hole parallel to said center screw hole and said spreader screw hole extending from first flat side to second flat side.

10. The electrode holder as in claim 9 further comprising a dowel insertable into said dowel hole.

11. The electrode holder as in claim 1 wherein each of said end caps contains an end cap screw hole.

12. The electrode holder as in claim 1 wherein each of said end caps contains an end cap dowel hole.

13. The electrode holder as in claim 1 wherein each of said end caps contains an end cap spreader screw hole.

14. The electrode holder as in claim 1 wherein said second end of said rotating head is cubical in form.

15. The electrode holder as in claim 1 further comprising screws positioned within said second end of said rotating head and extending into said pocket.

16. The electrode holder used in electrical discharge machining, comprising:

a stationary base having a first end and a second end;

a rotating head having a first end and a second end, wherein said first end is pivotally positioned over said second end of said stationary base;

two end caps affixable in parallel arrangement to said first end of said rotating head; and a slot positioned in center of said second end of said rotating head for receiving an electrode.

17. The electrode holder as in claim 16 wherein said first end of said stationary base has a cubical form.

18. The electrode holder as in claim 16 wherein said second end of said stationary base has a cylindrical form.

19. The electrode holder as in claim 16 wherein said second end of said stationary base contains a split allowing said second end to flex.

20. The electrode holder as in claim 16 wherein said second end of said stationary base contains a spreader screw hole.

21. The electrode holder as in claim 20 further comprising a spreader screw insertable into said spreader screw hole.

22. The electrode holder as in claim 16 wherein each of said end caps contains an end cap spreader screw hole.

23. The electrode holder as in claim 16 wherein each of said end caps contains at least one end cap screw hole.

24. The electrode holder as in claim 22 further comprising at least one end cap screw insertable into each of said end cap screw holes.

25. The electrode holder as in claim 16 wherein said second end of said rotating head is cubical in form.

26. The electrode holder as in claim 16 further comprising screws positioned within said second end of said rotating head and extending into said slot.

* * * * *